United States Patent [19]

Burns

[11] Patent Number: 5,835,855
[45] Date of Patent: Nov. 10, 1998

[54] ANTENNA SCANNING SYSTEM WITH LOW FREQUENCY DITHERING

[75] Inventor: Lawrence M. Burns, Mountain View, Calif.

[73] Assignee: 3Com Corporation, Santa Clara, Calif.

[21] Appl. No.: 660,965

[22] Filed: Jun. 12, 1996

[51] Int. Cl.$^6$ .............................. H04B 1/06; H04B 17/02
[52] U.S. Cl. ........................ 455/277.1; 455/133
[58] Field of Search .................... 455/273, 272, 455/277.1, 278.1, 279.1, 277.2, 52.1, 52.3, 132, 133, 140

[56] References Cited

U.S. PATENT DOCUMENTS

| | | | |
|---|---|---|---|
| 3,798,548 | 3/1974 | White et al. | 455/277.1 |
| 4,761,822 | 8/1988 | Maile | 455/277.1 |
| 4,814,882 | 3/1989 | Nuimura | 455/277.1 |
| 4,969,211 | 11/1990 | Raymond | 455/277.1 |
| 5,164,942 | 11/1992 | Kamerman et al. | |
| 5,276,920 | 1/1994 | Kuisma | 455/277.1 |
| 5,335,251 | 8/1994 | Onishi et al. | 455/132 |
| 5,507,035 | 4/1996 | Bantz et al. | 455/277.2 |
| 5,525,967 | 6/1996 | Azizi et al. | 455/277.1 |
| 5,548,834 | 8/1996 | Suard et al. | 455/273 |

OTHER PUBLICATIONS

Adachi, Fumiyuki, "Selection and Scanning Diversity Effects in a Digital FM Land Mobile Radio With Limiter Discriminator Detection," Tans. IECE of Japan, vol. 64–E, pp. 398–405, Jun. 6, 1981.

Adachi, et al., "Unified Analysis of Postdetection Diversity for Binary Digital FM Mobile Radio," IEEE Transactions on Vehicular Technology, vol. 37, No. 4, pp. 189–198, Nov. 1988.

Feher, Kamilo, "Diversity Techniques for Mobile–Wireless Radio Systems," Wireless Digital Communication—Modulation and Spread Spectrum Applications, Ch. 7, pp. 333–340, (1995).

Parsons, et al., "Single–Receiver Diversity Systems," IEEE Transactions on Communications, vol. Com–21, pp. 1276–1280, Nov. 1973.

Parsons, et al., "Mobile Communication Systems," Halstead Press, pp. 189–243, (1989).

Villard, Jr., et al., "A Mode–Averaging Diversity Combiner," IEEE Transactions on Antennas and Propagation, vol. AP–20, No. 4, pp. 463–469, Jul. 1972.

*Primary Examiner*—Reinhard J. Eisenzopf
*Assistant Examiner*—Sam Bhattacharya
*Attorney, Agent, or Firm*—Wilson Sonsini Goodrich & Rosati

[57] ABSTRACT

An antenna system for a communication device which receives and/or transmits packets of data having a characteristic reception interval comprises first and second antennas which are spatially diverse. A feed circuit is coupled to the first and second antennas to connect the first and second antennas to the communication device. The feed circuit includes a switching circuit and an oscillating switch driver which periodically select the first antenna and the second antenna, with a period which is normally substantially greater than the characteristic reception interval for the communication system. For example, if the period of the switching circuit is about one hundred milliseconds, and the data packet length is only 1.22 milliseconds as in the case of Ethernet, then many packets can be transmitted during each antenna configuration state. If both states are such that neither antenna is in a multipath null then no packets are dropped. If one antenna position is in a null, then the probability of the other position being in a null is vanishingly small. With a period of about 100 milliseconds, if one position is in a null there will be an interruption in the link. However, the user will not perceive the delay due to the fact that one tenth of a second is very short in terms of human reaction times. Another important point is that the switching on and off of each antenna is done relatively gradually. This is done so that the receiving station sees no switching impulses and so that the antenna environment changes gradually with respect to packet length.

25 Claims, 6 Drawing Sheets

ANTENNA SCANNING SYSTEM WITH LOW FREQUENCY DITHERING

CROSS-REFERENCE TO RELATED APPLICATION

The present application is relate to co-pending U.S. patent application Ser. No. 08/660,964, entitled DUAL ORTHOGONAL MONOPOLE ANTENNA SYSTEM, invented by Lawrence W. Burns and Chong L. Woo, filed on the same day as the present application, and owned by the same Assignee as the present application at the time of invention and currently. The copending application is incorporated by reference and is fully set forth herein.

BACKGROUND OF THE INVENTION

1. Field of the Invention

The present invention relates to wireless communication systems using spatially diverse antennas for avoiding the effects of multipath interference, and more particularly to approaches for selecting an active antenna in such systems.

2. Description of Related Art

Wireless communication systems are often employed with omnidirectional antennas to ensure flexibility of operation and ease of use even though directional antennas are generally more efficient. The requirement in directional antenna systems of aiming the beam at the target can be impractical due to the mobile nature of most wireless systems.

When omnidirectional antennas are used, especially in an environment where reflections occur, such as the in-office environment, signals can be received from many different paths at the same time, creating the so-called multipath effect. In many cases the level of each of these received signals will have approximately the same amplitude, and in some cases be out of phase with one another. This creates spatial regions where received signals cancel each other out, called a multipath null.

One of the most common ways to deal with multipath effects is to simply move the antenna out of the multipath nulls. This can be done by either physically moving the receiver or transmitter, or by switching between one or more antennas located at the receiver or transmitter which are spatially diverse. With sufficient processing power at the receiver, the quality of the link can be assessed for each of the antenna positions, assuming spatially diverse antennas are used. Based on the quality of the link for each antenna, a determination can be made as to which of the two antennas should be used. However, requiring a user to be responsible for determining link quality and positioning the receiver or transmitter for optimum reception is not preferred. Also, requiring the user to operate the device to determine which antenna is best is also is not preferred.

Further, since the wireless environment is constantly changing, the quality of the link needs to be reassessed on a periodic basis to ensure the best of the two antenna positions is chosen.

While this approach offers the best attainable throughput possible, it takes significant processing resources and sophisticated receiver circuits to implement. See, for instance, U.S. Pat. No. 5,164,942 by Kamerman, et al.

Accordingly, it is desirable to provide a simplified method for combatting multipath effects which does not require active control over the position of the antenna by a host computer or embedded controller.

SUMMARY OF THE INVENTION

The present invention can be characterized as an antenna system for a communication device which receives and/or transmits packets of data having a characteristic reception interval. The antenna system comprises a first and second antenna which are spatially diverse. The feed circuit is coupled to the first and second antennas to connect the first and second antennas to the communication device. The feed circuit includes a switching circuit and an oscillating switch driver which periodically select the first antenna and the second antenna, with a period which is normally substantially greater than the characteristic reception interval for the communication system. The system based on the recognition that the length of the data packet in most communication systems is reasonably short. For instance, in the Ethernet protocol, the maximum packet length is about 1.22 milliseconds. Furthermore, many networks are relatively lightly loaded in terms of the number of users and the type of computer application programs being used. For example, small, remote offices with less than ten people who primarily run applications such as word processing, e-mail, printing, et cetera, do not significantly load an Ethernet-type network. Thus, by providing a system which switches between antennas with dwell times on each antenna position that is longer than the maximum packet length for the system, overall throughput can be sufficient for many applications. This reduction in complexity greatly simplifies the wireless receiver, reducing the cost and size.

The host processor in the communications device need not be involved in the antenna switching for spatial diversity according to the present invention. For example, if the period of the switching circuit is about one hundred milliseconds, and the data packet length is only 1.22 milliseconds as in the case of Ethernet, then many packets can be transmitted during each antenna configuration state. If both states are such that neither antenna is in a multipath null then no packets are dropped. If one antenna position is in a null, then the probability of the other position being in a null is vanishingly small. With a period of about 100 milliseconds, if one position is in a null there will be an interruption in the link. However, the user will not perceive the delay due to the fact that one tenth of a second is very short in terms of human reaction times.

Another important point is that the switching on and off of each antenna may be done relatively gradually, so that the receiving station sees no switching impulses and so that the antenna environment changes gradually with respect to packet length.

According to one aspect of the invention, the switch driver periodically cycles through a first state in which the first antenna is selected, a second state in which both the first and second antennas are selected, a third state in which the second antenna is selected, and a fourth state in which both the first and second antennas are selected. The antenna configuration state in which both antennas are selected provides a third antenna configuration in a two antenna system. Furthermore, the switches are operated so that they transition relatively gradually during a transition time between states. The transition time according to this aspect of the invention is greater than the characteristic reception interval for packets in the device.

According to an alternative aspect of the invention, the switch driver periodically cycles through a first state in which only the first antenna is selected, and a second state in which only the second antenna is selected. Transitions between states are gradual as stated above.

The invention can also be characterized as an antenna system for a communications device which receives and/or transmits packets of data having a characteristic interval defined by a maximum allowable packet length. The antenna system comprises a circuit board, and first and second monopole antennas mounted on the circuit board, and spatially diverse relative to one another. The feed circuit is mounted on the circuit board, and includes the switch circuit and the switch driver as discussed above for low frequency (relative to the packet length) dithering between antennas.

Accordingly, the present invention offers a greatly simplified method of combating multipath effects that does not require any control over the position of the antenna by the host computer, or embedded control associated with the antennas. This reduction in complexity greatly simplifies the wireless receiver reducing cost and size. This technology provides a low cost alternative for lightly loaded networks, such as encountered in small offices.

Other aspects and advantages of the present invention can be seen upon review of the figures, the detailed description, and the claims which follow.

DETAILED DESCRIPTION OF PREFERRED EMBODIMENTS

A detailed description of preferred embodiments of the present invention is provided with respect to the figures.

Figure 1:
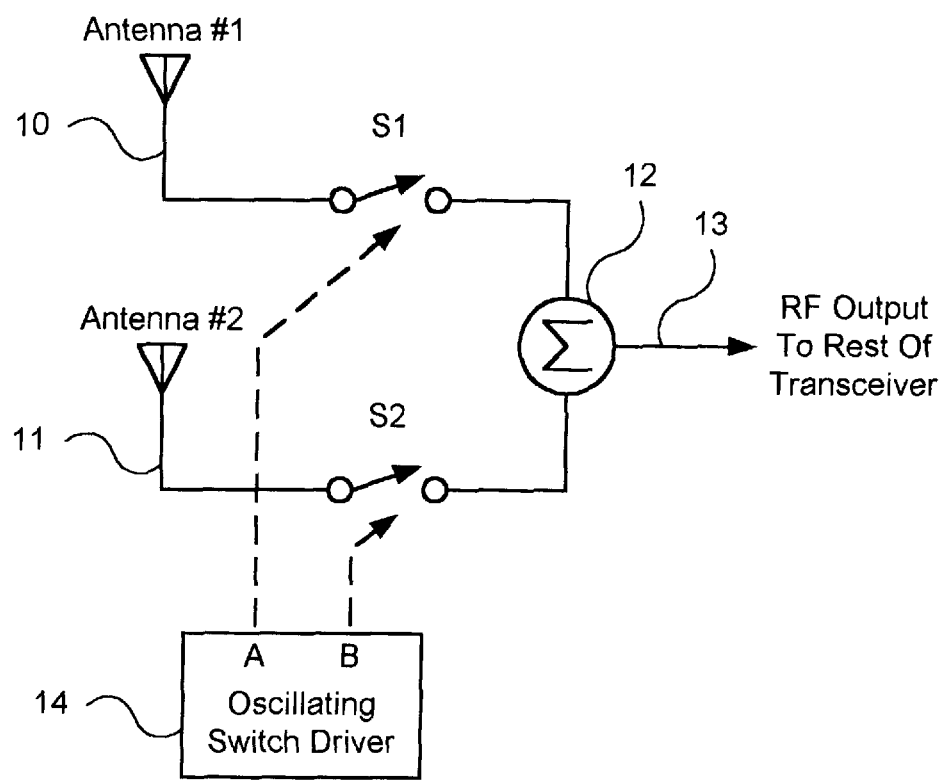
FIG. 1 is a conceptual block diagram of the antenna dithering system according to the present invention.

In FIG. 1 a conceptual schematic diagram of a system according to the present invention for selecting an active antenna is illustrated. As shown in FIG. 1, a first antenna 10 and a second antenna 11 are provided. Each antenna is coupled to a switch S1 and S2, respectively. The switches are coupled to a summing junction 12. The output of the summing junction is provided on line 13 to the rest of the communications device or transceiver. An oscillating switch driver 14 controls the switches S1 and S2, so that the active antenna automatically changes over time to ensure spatial diversity for the device independent of other processing on the device.

Figure 2:
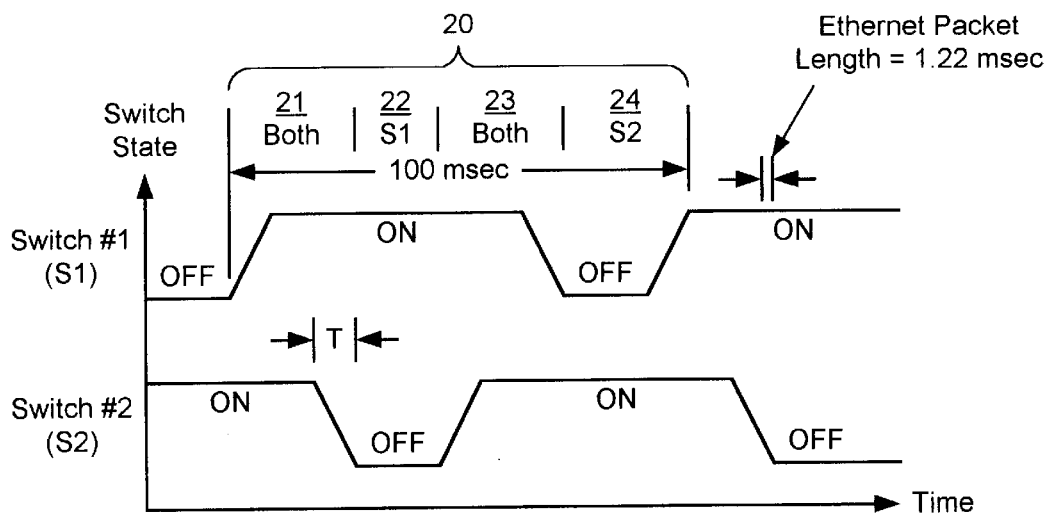
FIG. 2 illustrates timing waveforms for controlling the switches of FIG. 1 according to a first embodiment.
Figure 3:
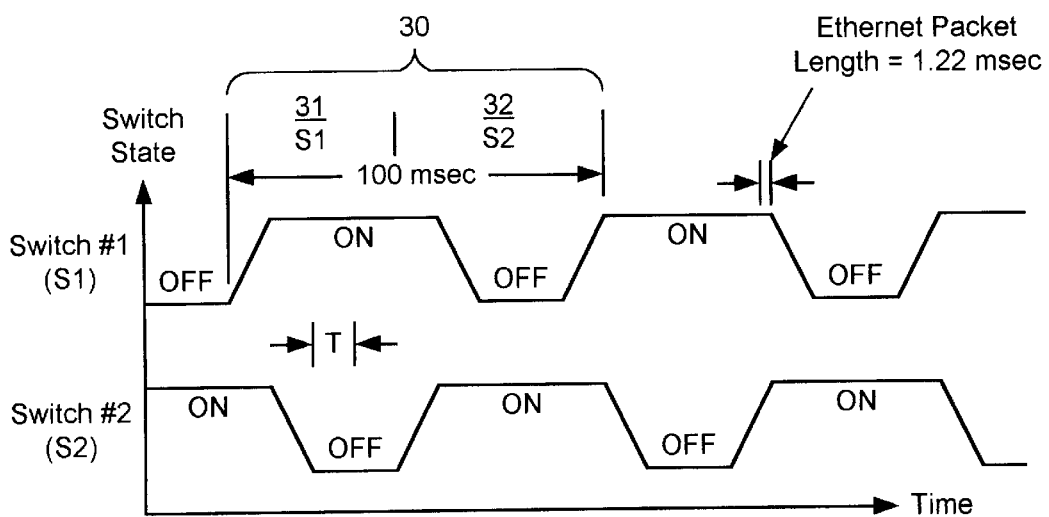
FIG. 3 illustrates timing waveforms for controlling the switches of FIG. 1 according to a second embodiment.

For the oscillating switch driver, the timing wave forms, according to the present invention, can take the shapes shown in FIGS. 2 and 3. In FIG. 2, a four state antenna system is provided. The oscillating driver 14 periodically switches the antenna system through the four states automatically. Thus, one period for the oscillating switch driver 14, as shown in FIG. 2, is a 100 millisecond cycle, generally 20. In the cycle 20, there is a first state, generally 21, in which both switches are on, a second state, generally 22, during which switch S1 is on and switch S2 is off, a third state, generally 23, during which both switches are on, and a fourth state, generally 24, during which switch S2 is on and switch S1 is off. This cycle 20 continuously and automatically repeats to ensure spatial diversity in the receiving system.

Also, as shown in FIG. 2, the transitions, such as transition T, are relatively gradual, so that the switches turn off slowly. The transition time T is substantially greater than the characteristic packet reception time of the system. Thus, for a wireless system which communicates Ethernet packets, the maximum packet length is about 1.22 milliseconds. Thus, the transition time T for such a system would range from 2 to 10 milliseconds. The gradual transition T allows for a "fade" effect as the state changes, so that packets being transmitted or received during the change are less likely to be lost.

The cycle time 20 is on the order of 100 milliseconds or less, so that within the human reaction time, the best state of the antenna system will be provided for communicating a given packet. Thus, if the packet transmitted during a state during which poor reception occurs, it will be retried during a following state, within a period of time which is not noticeable by human operators.

Furthermore, each of the states is substantially longer than the maximum packet length in the communication system. This ensures that during any given state, a number of packets can be transmitted successfully before a less desirable antenna configuration is switched to. Thus, the period of oscillating switch driver is substantially greater than the maximum packet length, preferably each state during the period 20 is greater than 10 times the maximum packet length.

The four state cycle 20 offers in effect three antenna configurations to combat multipath effects with spatial diversity. During the state in which both switches are on, an "array antenna" is set up which has spatial characteristics which appear offset to region between the two antennas.

An alternative antenna dithering control waveform is shown in FIG. 3, in which each cycle, generally 30, has two states, state 31, during which switch S1 is on, and state 32, during which S2 is on. Again, the cycle time is on the order of 100 milliseconds or less.

Figure 4:
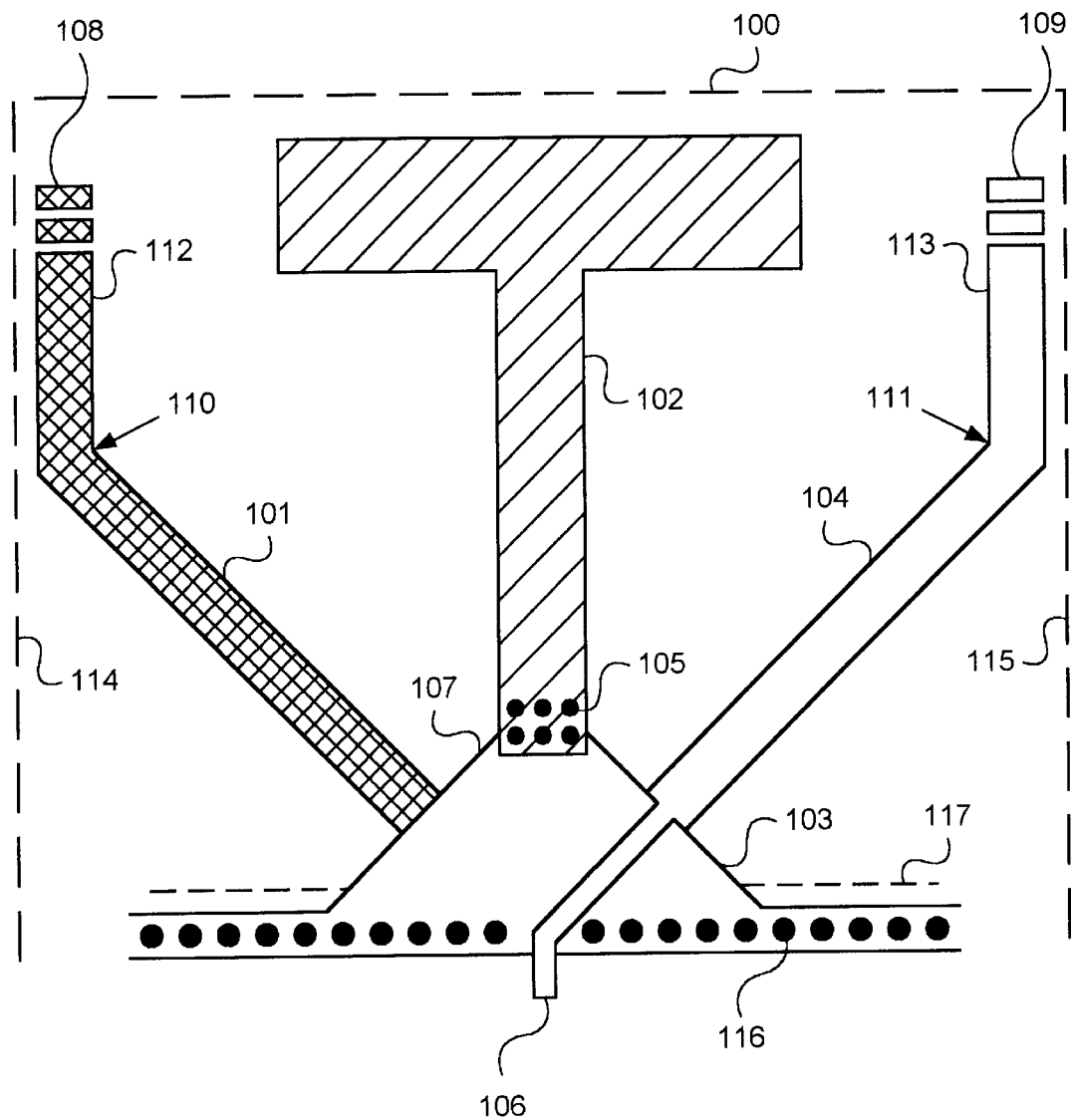
FIG. 4 illustrates a preferred implementation of a dual monopole antenna system on a printed circuit board for use with the switching system of FIG. 1.

The antennas 10 and 11 of FIG. 1 can be implemented as shown in FIG. 4 as dual orthogonal monopoles as described below. Alternative systems can use spatially diverse ceramic patch antenna, or dipole antennas. Also, other monopole antenna structures can be utilized as described in the above cross-referenced application.

FIG. 4 illustrates an expanded view of a preferred embodiment of a pair of monopole antennas designed to fit within the PCMCIA form factor for printed circuit boards. Thus, the edge of the printed circuit board is generally represented by the line 100. A first monopole element 101 is formed on the outside surface of a bottom layer of dielectric. A ground trace 102 is formed between the layers of the dielectric, or one could be formed on one or both of the inside surfaces of the dielectric and connected to the ground plane by vias. The ground plane 103 is formed in between the top and bottom layers of dielectric. A second monopole element 104 is formed on the outside surface of the top layer of the dielectric. A similar ground trace, not shown, is formed on the outside surface of the bottom layer of dielectric. The ground trace 102 and the similar trace on the bottom are coupled by vias generally 105 to the ground plane 103.

The monopole element 104 is coupled to an unbalanced impedance matched feed line 106 which comprises a microstrip formed on the outside surface of the top layer of dielectric. A similar feed line generally 107 is formed connecting the element 101 to the circuitry, and formed on the outside surface of the bottom dielectric layer. Tuning stubs generally 108 and 109 are formed adjacent to the ends of the monopole elements 101 and 104, respectively. Furthermore, the monopole elements 101 and 104 are generally straight microstrips along the majority of their length, but have an elbow, 110, 111 near the end of the element to accommodate the form factor of the circuit board 100. Thus, a tip segment of the microstrip antenna, generally 112 for element 101, and 113 for element 104, stand parallel to the sides, generally 114 and 115 of the printed circuit board 100. Because of the elbow structure, isolation of the antennas, due to the orthogonal relationship, is reduced. Thus, the ground trace 102 is added to improve that isolation.

The ground plane 103 is coupled to the circuitry on the circuit board 100, by means of vias, generally 116. Also, a shield structure, not shown in FIG. 4, extends to a shield line 117. The shield comprises a conductive material which is coupled to the ground plane by means of the vias 116, shielding the circuitry on the circuit board 100 from the antenna structure.

Figure 5:
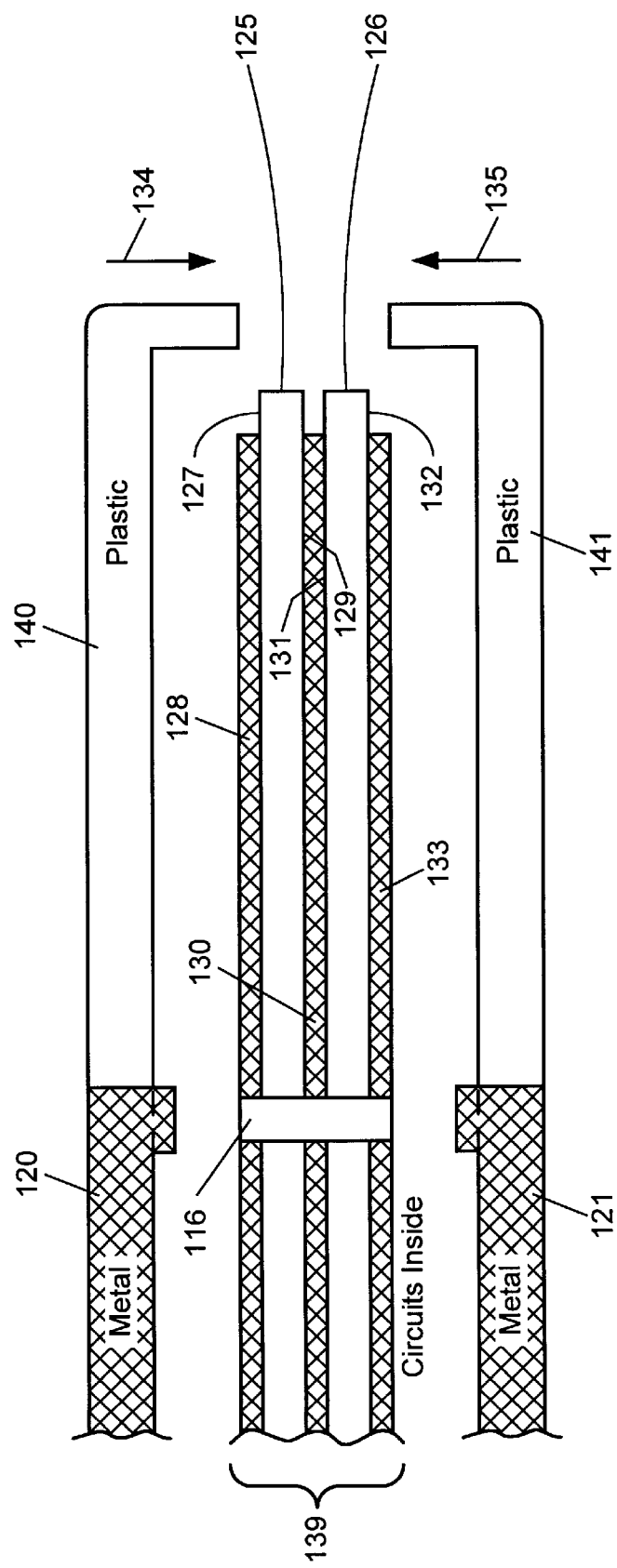
FIG. 5 illustrates the construction of a communications device using the dual monopole antenna structure of FIG. 4.

FIG. 5 illustrates a side view of the communications device assembly which includes the antenna structure of the present invention. As shown in FIG. 5, a shield metal covering 120 is provided for a top side of the device, and a metal covering 121 is provided for the bottom side. Circuitry is mounted on the circuit board inside the shield structure. The ground vias 116 contact the shields 120 and 121 when the structure is assembled. The antenna system includes a first dielectric layer 125 and a second dielectric layer 126 which are coupled to the circuit board inside the shield, and extend beyond the shield. On the outside surface, generally 127, of the first layer 125 of dielectric, metalization 128 is provided to establish the ground trace 102 and the antenna element 104 of FIG. 4. The inside surface 129 of the first dielectric layer is coupled to the ground plane metalization 130. Similarly, the inside surface 131 of the bottom layer 126 of dielectric is coupled to the ground plane 130. The outside surface 132 of the bottom layer of dielectric 126 carries metalization 133 for the antenna element 101.

As represented by the arrows, generally 134 and 135, the shield structure including metal 120 and plastic extension 140, and metal 121 and plastic extension 141 are snapped over the circuit board assembly and antenna system to enclosed the device. The plastic will be transparent to the RF wavelengths used by the communications device. FIG. 5 shows an end of a printed circuit board, generally 139, which includes the antenna system of the present invention.

Figure 6:
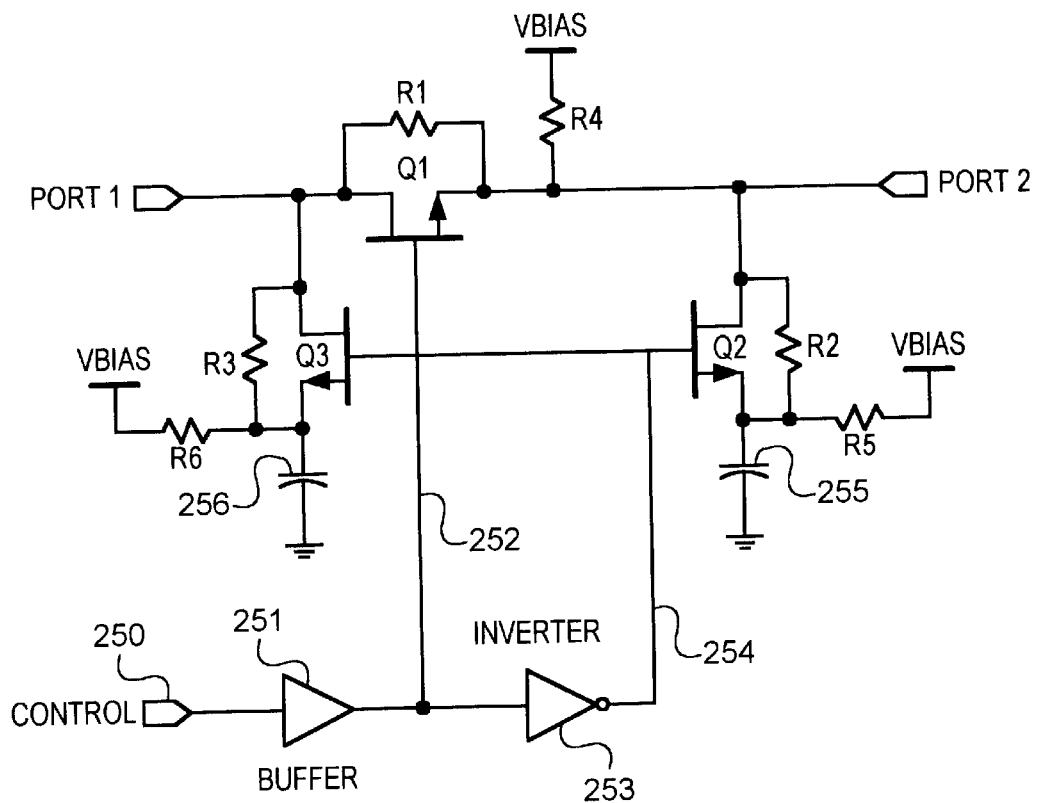
FIG. 6 is an electrical schematic diagram of a MESFET switch for use with the switching system of FIG. 1.

FIG. 6 illustrates a monolithic microwave integrated circuit design, which could be used for the switches S1 and S2 in an integrated circuit embodiment of the present invention. In FIG. 6, the switch is based on three MESFET transistors, Q1, Q2, and Q3. The oscillating switch driver supplies a control signal on line 250, having a shape, such as illustrated for switch S1 or switch S2 in FIG. 2 or FIG. 3. The control signal is supplied through buffer 251 to the gate of transistor Q1 across line 252. Also, the output of the buffer 251 is connected to an inverter 253. The output of the inverter 253 is connected across line 254 to the gates of transistors Q2 and Q3. The drain of transistor Q1 is connected to PORT1 which would be connected to the feed for an antenna, such as antenna 210 of FIG. 1. The source of transistor Q1 is connected to PORT2, which is connected to the summing junction 212 of the circuit of FIG. 1.

The drain of transistor Q2 is connected to PORT2, and the emitter of transistor Q2 is connected through a capacitor 255 to ground. Similarly, the drain of transistor Q3 is connected to PORT1, and the emitter of transistor Q3 is connected to a capacitor 256 to ground.

Each of the transistors Q1, Q2, and Q3 has a resistor, R1, R2, R3 connected across its source and drain, and a resistor R4, R5, R6 connected from the source to a bias potential VBIAS. The voltage VBIAS is essentially one diode drop below the power supply level $V_{DD}$ for the circuit.

Figure 7:
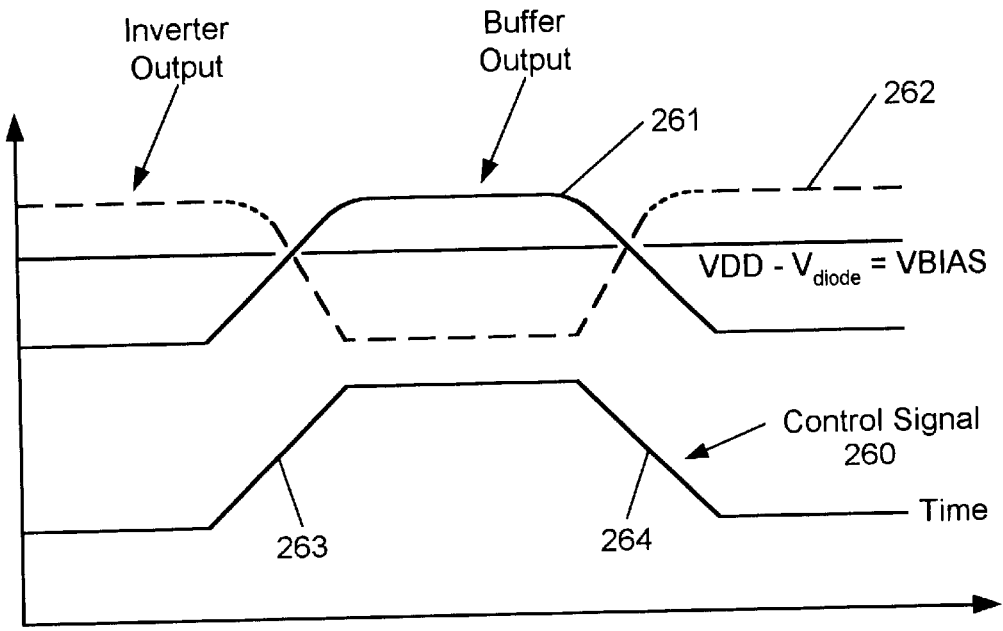
FIG. 7 is a timing diagram used to illustrate the operation of the switch of FIG. 6.

FIG. 7 is a timing diagram for operation of the switch of FIG. 6. The control signal is shown at trace 260, the output of the buffer 251 is shown at trace 261, and the output of the inverter 253 is shown at trace 262. In operation, the switch provides a gradual switching from a first open state to a closed state, determined by the slope of the transition, generally 263, on the control signal 260. Thus, when the control signal begins to rise in the region 263, transistor Q1 slowly turns on, directly connecting PORT1 to PORT2. Similarly, transistors Q3 and Q4 slowly turn off in response to the output of the inverter, disconnecting PORT1 and PORT2 from ground. During the transition 264 of the control signal 260, the transistor Q1 turns off as the control signal drops, while transistors Q3 and Q2 turn on.

Figure 8:
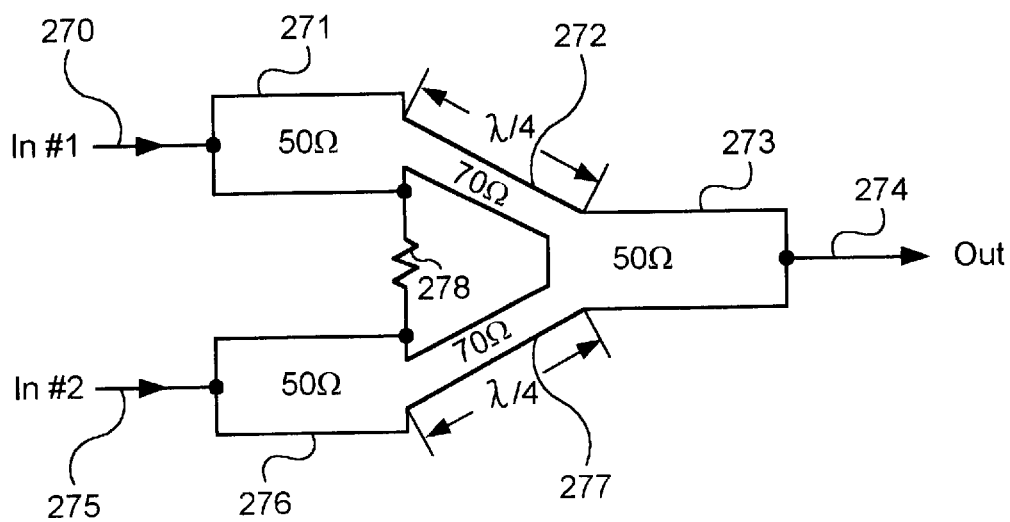
FIG. 8 illustrates a Wilkinson coupler used as a summing junction for the switch circuit of FIG. 1.

FIG. 8 illustrates a preferred embodiment of the summing junction 212 of FIG. 1. In the embodiment of FIG. 8, a Wilkinson coupler is utilized to connect the outputs of the switches to a single ended unbalanced line to the circuitry of the communications device. Thus, the output of switch S1 is supplied on line 270 to a 50 ohm microstrip 271. The 50 ohm microstrip 271 is coupled to a 70 ohm microstrip 272 which is about $\lambda/4$ long, where $\lambda$ is the wavelength of the nominal center frequency of the communications device. The 70 ohm microstrip 272 is coupled to a 50 ohm microstrip 273 which provides the output on line 274. Similarly, the input from the second switch is provided on line 275 to a 50 ohm microstrip 276. The 50 ohm microstrip 276 is connected to a 70 ohm microstrip 277 which is about $\lambda/4$ long, which is in turn coupled to the microstrip 273. A resistor 278 is coupled between the ends of the microstrips 271 and 276 adjacent the connections to the 70 ohm microstrips 272 and 277. This is 100 ohm resistor in the embodiment illustrated used to provide isolation between the two input ports.

Accordingly, the present invention provides a system for ensuring antenna diversity in communications devices which greatly simplifies the communications device. It provides the ability to make a low cost communications device which satisfies the needs of most environments based on the elegant low frequency dithering of the antennas independent of any other processing resources on the device.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An antenna system for a communications device which communicates packets of data having a characteristic reception interval, the communications device for use in a communications system in which dropped packets can be automatically retransmitted, the antenna system comprising:

a first antenna;

a second antenna spatially diverse relative to the first antenna; and a feed circuit coupled to the first and second antennas to connect the first and second monopole antennas to the communications device, including a switch circuit and a switch driver which periodically selects the first antenna and the second antenna with a period greater than the characteristic reception interval of the packets of data, independent of other processing in the communications device.

2. The antenna system of claim 1, wherein the switch driver periodically cycles through a first state in which the first antenna is selected and a second state in which the second antenna is selected.

3. The antenna system of claim 1, wherein the period of the switch driver is less than about 0.1 seconds.

4. An antenna system for a communications device which communicates packets of data having a characteristic reception interval, the antenna system comprising:

a first antenna;

a second antenna spatially diverse relative to the first antenna; and a feed circuit coupled to the first and second antennas to connect the first and second monopole antennas to the communications device, including a switch circuit and a switch driver which periodically selects the first antenna and the second antenna with a period greater than the characteristic reception interval independent of other processing in the communications device wherein the switch driver periodically cycles through a first state in which the first antenna is selected, a second state in which both the first and second antennas are selected, a third state in which the second antenna is selected, and a fourth state in which both the first and second antennas are selected.

5. The antenna system of claim 4, wherein each of said states is longer than three times the characteristic reception interval.

6. The antenna system of claim 5, wherein the period is less than about 0.1 seconds.

7. The antenna system of claim 6, wherein the characteristic reception interval is less than about 1.5 milliseconds.

8. The antenna system of claim 7, wherein the switch circuit transitions from one state to a next relatively gradually during a transition time, wherein the transition time is between about 2 and about 10 milliseconds.

9. The antenna system of claim 4, wherein the switch circuit transitions from one state to a next relatively gradually during a transition time, wherein the transition time is greater than the characteristic reception interval.

10. An antenna system for a communications device which communicates packets of data having a characteristic reception interval, the antenna system comprising:

a first antenna;

a second antenna spatially diverse relative to the first antenna; and a feed circuit coupled to the first and second antennas to connect the first and second monopole antennas to the communications device, including a switch circuit and a switch driver which periodically selects the first antenna and the second antenna with a period greater than the characteristic reception interval independent of other processing in the communications device;

wherein the switch driver periodically cycles through a first state in which the first antenna is selected and a second state in which the second antenna is selected; and wherein the switch circuit transitions from one state to a next relatively gradually during a transition time, wherein the transition time is greater than the characteristic reception interval.

11. An antenna system for a communications device which communicates packets of data having a characteristic reception interval, the antenna system comprising:

a first antenna;

a second antenna spatially diverse relative to the first antenna; and a feed circuit coupled to the first and second antennas to connect the first and second monopole antennas to the communications device, including a switch circuit and a switch driver which periodically selects the first antenna and the second antenna with a period greater than the characteristic reception interval independent of other processing in the communications device;

wherein the switch circuit includes a Wilkinson power divider to provide a summing junction.

12. An antenna system for a communications device which communicates packets of data having a characteristic reception interval defined by a maximum allowable packet length, the antenna system comprising:

a circuit board;

a first monopole antenna on the circuit board;

a second monopole antenna on the circuit board and spatially diverse relative to the first antenna; and a feed circuit on the circuit board and coupled to the first and second monopole antennas to connect the first and second monopole antennas to the communication device, including a switch circuit and a switch driver which periodically selects the first monopole antenna and the second monopole antenna with a period greater than the ten times the characteristic reception interval.

13. The antenna system of claim 12, wherein the switch driver periodically cycles through a first state in which the first antenna is selected and a second state in which the second antenna is selected.

14. The antenna system of claim 12, wherein the switch driver periodically cycles through a first state in which the first antenna is selected and a second state in which the second antenna is selected; and wherein the switch circuit transitions from one state to a next relatively gradually during a transition time, wherein the transition time is greater than the characteristic reception interval.

15. The antenna system of claim 12, wherein the period is less than about 0.1 seconds.

16. An antenna system for a communications device which communicates packets of data having a characteristic reception interval defined by a maximum allowable packet length, the antenna system comprising:

a circuit board;

a first monopole antenna on the circuit board;

a second monopole antenna on the circuit board and spatially diverse relative to the first antenna; and a feed circuit on the circuit board and coupled to the first and second monopole antennas to connect the first and second monopole antennas to the communication device, including a switch circuit and a switch driver which periodically selects the first monopole antenna and the second monopole antenna with a period greater than the ten times the characteristic reception interval;

wherein the switch driver periodically cycles through a first state in which the first antenna is selected, a second state in which both the first and second antennas are selected, a third state in which the second antenna is selected, and a fourth state in which both the first and second antennas are selected.

17. The antenna system of claim 16, wherein each of said states is longer than three times the characteristic reception interval.

18. The antenna system of claim 17, wherein the period is less than about 0.1 seconds.

19. The antenna system of claim 18, wherein the characteristic reception interval is less than about 1.5 milliseconds.

20. The antenna system of claim 19, wherein the switch circuit transitions from one state to a next relatively gradually during a transition time, wherein the transition time is between about 2 and about 10 milliseconds.

21. The antenna system of claim 16, wherein the switch circuit transitions from one state to a next relatively gradually during a transition time, wherein the transition time is greater than the characteristic reception interval.

22. An antenna system for a communications device which communicates packets of data having a characteristic reception interval defined by a maximum allowable packet length, the antenna system comprising:

a circuit board;

a first monopole antenna on the circuit board;

a second monopole antenna on the circuit board and spatially diverse relative to the first antenna; and a feed circuit on the circuit board and coupled to the first and second monopole antennas to connect the first and second monopole antennas to the communication device, including a switch circuit and a switch driver which periodically selects the first monopole antenna and the second monopole antenna with a period greater than the ten times the characteristic reception interval; and wherein the switch circuit includes a Wilkinson power divider to provide a summing junction.

23. An antenna system for a communications device which communicates packets of data having a characteristic reception interval, the antenna system comprising:

a first antenna;

a second antenna spatially diverse relative to the first antenna;

an oscillating switch driver having a period of oscillation greater than the characteristic reception interval; and a switch circuit coupled to the oscillating switch driver and coupled to the first and second antennas to connect the first and second antennas to the communications device, the switch circuit selecting the first antenna and the second antenna in response to the oscillating switch driver.

24. The antenna system of claim 23, wherein the fixed period of oscillation is greater than about 1.5 milliseconds.

25. The antenna system of claim 23, wherein the fixed period of oscillation is less than about 0.1 seconds.

* * * * *